United States Patent [19]

O'Ffill

[11] 4,246,998
[45] Jan. 27, 1981

[54] CONICAL SCREEN STRUCTURE

[75] Inventor: Joseph M. O'Ffill, Shawnee Mission, Kans.

[73] Assignee: Shale Oil Science & Systems, Inc., Kansas City, Mo.

[21] Appl. No.: 59,236

[22] Filed: Jul. 20, 1979

[51] Int. Cl.³ .............................................. C10G 1/02
[52] U.S. Cl. .................................. 196/46.1; 209/281; 208/11 R; 210/499; 210/323.1; 196/107
[58] Field of Search ............... 196/46.1, 46, 104, 107; 209/274, 281-283, 250, 36, 37, 28, 29; 208/11; 210/150, 497, 499, 323

[56] References Cited

U.S. PATENT DOCUMENTS

| | | | |
|---|---|---|---|
| 4,088,562 | 5/1978 | O'Ffill | 208/11 |
| 4,116,779 | 9/1978 | Harris | 208/11 |

*Primary Examiner*—Norman Yudkoff
*Attorney, Agent, or Firm*—Schmidt, Johnson, Hovey & Williams

[57] ABSTRACT

An improved, multiple-well screen structure is provided which is especially adapted for use in a large scale reactor employed in oil shale processing operations. The screen includes a plurality of adjacent, juxtaposed concavities each presenting perforate sidewalls and a lower outlet opening. Preferably, the screen is circular in plan configuration and includes three sector-shaped (in plan) concavities respectively formed from cone sections. The sections are interconnected along arcuate, reinforced juncture lines to present a structurally sound material supporting, gas-pervious screen which can be easily and completely emptied using only gravity-induced material flow.

2 Claims, 3 Drawing Figures

U.S. Patent  Jan. 27, 1981  4,246,998
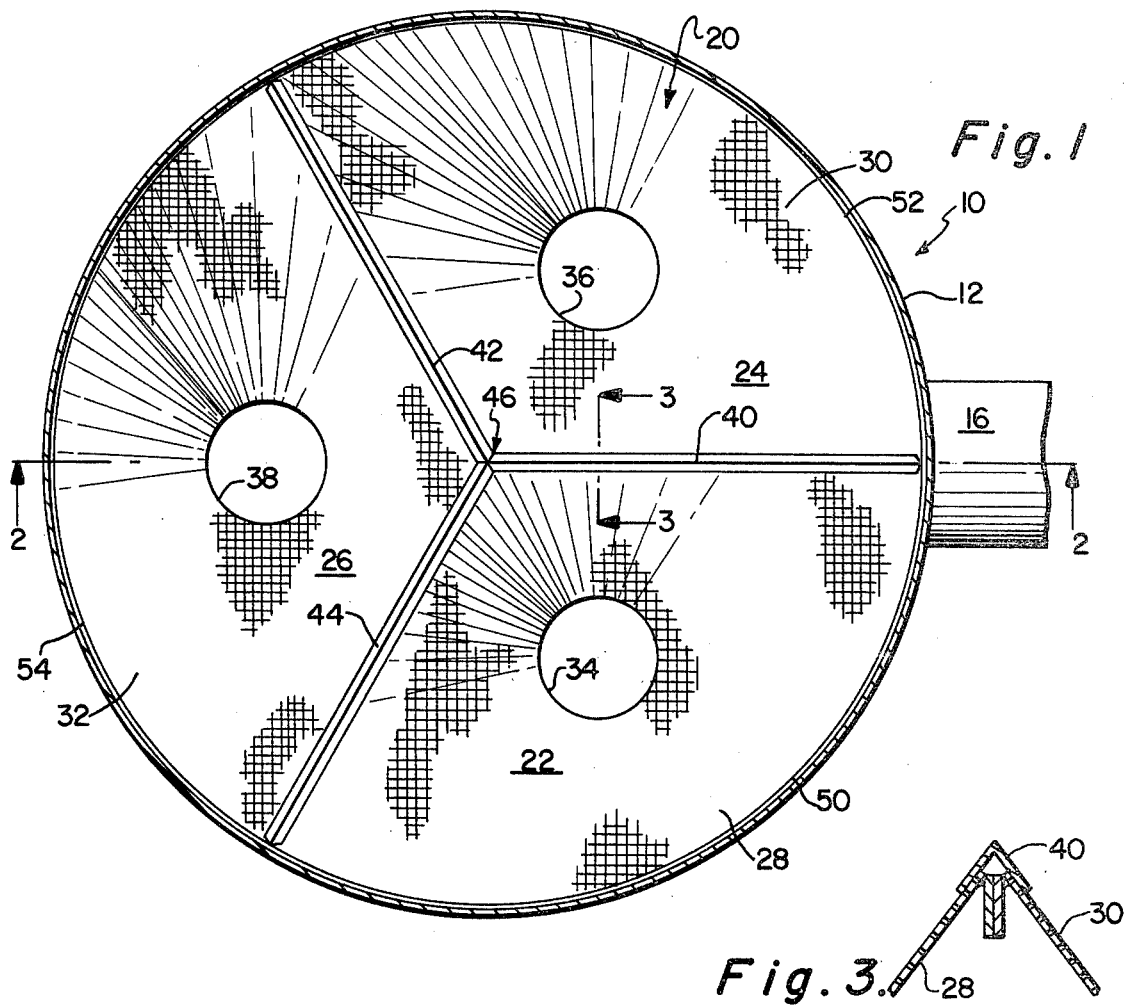
*Fig. 1*
*Fig. 3.*
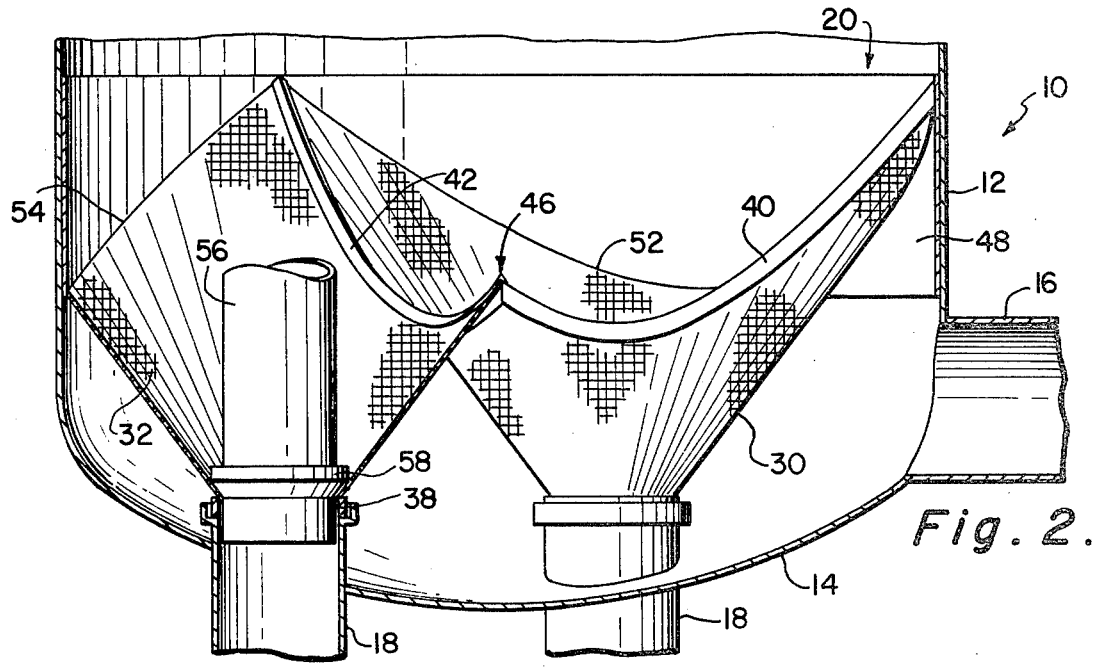
*Fig. 2.*

CONICAL SCREEN STRUCTURE

BACKGROUND OF THE INVENTION

1. Field of the Invention

The present invention is concerned with improved reactor screen apparatus especially useful in conjunction with an oil shale reactor of the type described in U.S. Pat. No. 4,088,562. More particularly, it is concerned with such a reactor screen which is characterized by provision of a plurality of shale-receiving concavities especially designed to facilitate even gas flow through the shale pile and rapid, gravity-induced emptying of the reactor when the recoverable hydrocarbons have been removed from the shale. It is also contemplated that the screen hereof will be useful in other manufacturing and recovery processes.

2. Description of the Prior Art

U.S. Pat. No. 4,088,562 describes a major breakthrough in the art of oil shale processing. As an adjunct of this process, a batch-type reactor is employed wherein a charge of shale is suspended in a substantially stationary condition while hot, oxygen-free gases are passed therethrough. Within the reactor, the charge of shale is supported upon a gas-pervious, perforate screen. In practice, hot gases are passed upwardly through a central riser, and thence are directed downwardly through the shale pile for passage through the screen and ultimate transfer to a furnace for reheating thereof.

In view of the relationship between the invention herein described and claimed and U.S. Pat. No. 4,088,562, the latter patent is hereby expressly incorporated by reference into this specification.

It will be readily appreciated that large scale commercial operations in accordance with U.S. Pat. No. 4,088,562 require one or more large reactors (at present reactors capable of holding 60 and 120 ton charges of shale are contemplated), and accordingly the shale-supporting screens thereof must be engineered from the standpoint of several important operational characteristics. For example, with such large masses of shale it is important that an adequate and even flow of heating gases be provided, and that channeling of gas flow through the pile is avoided. Furthermore, shale rock used in the process is in the form of irregularly shaped pieces which, after the heating step, are very hot. Accordingly, manual handling of such rock is absolutely precluded, even if this were viable from a commercial standpoint. As a consequence, the reactor and associated shale-supporting screen must be constructed so as to ensure smooth material flow of hot shale without plugging of the system. Finally, it will be readily understood that a screen selected for use in a shale oil reactor must be sufficiently strong to withstand the weight of the shale and the rather severe operating conditions encountered.

SUMMARY OF THE INVENTION

The present invention provides a solution to problems outlined above through use of a reactor screen having structure defining a plurality of adjacent, juxtaposed cavities each presenting perforate sidewalls and a material outlet opening adjacent the base of the concavity. In preferred forms, the overall screen is circular in plan, whereas the interconnected concavities are substantially sector-shaped in plan; and in order to ensure smooth operation, the respective concavities are preferably formed from conical sections.

The screen is adapted for positioning at the base of a reactor of the type described in U.S. Pat. No. 4,088,562, and specialized riser structure associated with the respective conical concavities is employed for passage of heating gases upwardly through a shale pile, and for subsequent gravity-induced flow of spent shale from the reactor as needed.

BRIEF DESCRIPTION OF THE DRAWING

FIG. 1 is a sectional view of an oil shale reactor having the screen of the present invention installed therein, with the screen being depicted in plan;

FIG. 2 is a sectional view taken along line 2—2 of FIG. 1 which further illustrates the construction of the screen and associated apparatus; and FIG. 3 is a sectional view taken along line 3—3 of FIG. 1 which illustrates the juncture of a pair of adjacent screen concavities.

DESCRIPTION OF THE PREFERRED EMBODIMENT

Turning now to the drawing, a reactor 10 similar to that illustrated in U.S. Pat. No. 4,088,562 is depicted in FIGS. 1 and 2. The reactor is of circular cross-section and includes an upstanding, tubular sidewall 12, an apertured, domed base 14, and a similar enclosing top (not shown). A gas transfer line 16 communicates with the interior of reactor 10 adjacent base 14. Furthermore, three upstanding delivery pipes 18 extend through base 14 for purposes to be made clear.

A reactor screen 20 is secured within reactor 10 adjacent the lower end of sidewall 12. Broadly speaking, the screen 20 comprises structure defining a plurality of adjacent, juxtaposed concavities respectively referred to by the numerals 22, 24 and 26. Each of the concavities presents a continuous, downwardly tapered, conical sidewall 28, 30 and 32 formed of perforate, preferably metallic material. Each such wall terminates in a lower circular reinforced opening 34, 36 or 38.

Referring specifically to FIG. 1, it will be seen that overall screen 20 is circular in plan configuration, with each of the concavities 22, 24 and 26 being substantially sector-shaped in plan and in the form of a portion of a cone. The respective concavity-defining conical sections are interconnected along arcuate junction edges 40, 42 and 44. Each junction edge is formed by an inverted, V-shaped, elongated case hardened cap (see FIG. 3) which serves to reinforce and rigidify the overall structure of the screen 20. The common juncture point 46 of the edges 40, 42 and 44 is at the central area of the screen 20 and is lower than the outermost margins presented by the respective junction edges.

Screen 20 further includes a circumscribing metallic collar 48 which surrounds the screen 20 and is interconnected with the outer defining edges of the screen concavities. As illustrated in FIG. 2, the respective outermost edges 50, 52 and 54 of the concavities are arcuate in configuration and are permanently affixed to the depending collar 48. The screen 20 is welded to the pipes 18 at the area of the openings 34, 36, 38, but is not otherwise connected to reactor 10; this permits the screen to expand under the influence of heat. Furthermore, an annular, inwardly extending material guard (not shown) is connected to the inner surface of wall 12 above the upper margin of collar 48 for preventing flow of shale into the region below screen 20.

In the use of reactor 10, three vertically shiftable risers 56 (only one of which is shown in FIG. 2) are respectively vertically oriented within the reactor for communication with the pipes 18. In this respect each riser 56 includes a frusto-conical valve collar 58 which mates with the lowermost margin of the associated concavity-defining sidewall as seen in FIG. 2, when the riser is in its lowermost position. During shale processing operations, the respective risers are placed in their FIG. 2 position, and the reactor is filled with shale. At this point, hot, oxygen-free gases are directed through the separate pipes 18 for travel upwardly through the risers 56. The gases are then directed by means (not shown) downwardly back through the shale pile for ultimate passage through the perforate screen sidewalls 28, 30 and 32. Such gases then pass through the line 16 back to the furnace (not shown) for the system.

After the recoverable hydrocarbons have been removed from the shale within the reactor 10 in accordance with U.S. Pat. No. 4,088,562, the risers 56 are shifted vertically out of interfitting engagement with pipes 18, the latter being in operative communication with a spent shale disposal system, also not shown. When this occurs, the shale within reactor 10 flows through the openings 34, 36 and 38 and the pipes 18 to the disposal system. By virtue of the conical configuration of the respective concavities 22, 24 and 26 a positive, gravity-induced flow of shale out of reactor 10 is assured. Also, the arcuate junction edges 40, 42 and 44 facilitate such gravity flow inasmuch as these edges slope downwardly toward the central area of the screen and thus do not present an interference to material flow.

In continued operations, the risers 56 are simply shifted back to their normal operative position in communication with the pipes 18, and a fresh charge of shale is placed in the reactor 10.

It will thus be seen that the reactor screen and associated structure of the present invention allow processing of a large volume of shale rock by the methods of U.S. Pat. No. 4,088,562. In particular, a large volume of heating gas is evenly spread throughout the shale pile, while at the same time easy removal and handling of hot, spent shale is facilitated.

Having thus described the invention, what is claimed as new and desired to be secured by Letters Patent is:

1. A screen comprising:

structure defining a plurality of adjacent, juxtaposed concavities each presenting perforate sidewalls and a material outlet opening adjacent the base of the concavity, said screen being substantially circular in plan, each of said concavities being substantially sector-shaped in plan, in the form of a portion of a regular cone, and having an outer marginal edge and a pair of side marginal edges which intersect said outer marginal edge and extend inwardly therefrom and converge to meet at the central region of said screen, each of said outer marginal edges being arcuate and extending from the points of intersection thereof with the associated side marginal edges downwardly to a point lower than said points of intersection at the central region of the outer marginal edges, each of said side marginal edges being arcuate and extending from the point of intersection thereof with the associated outer marginal edge inwardly and downwardly to a low point spaced radially outwardly from the center of said screen, and thence upwardly and inwardly from said low point to said central region of the screen, the latter being above said low point but below the points of intersection of the side marginal edges and the outer marginal edges of said concavities, said concavities being joined together along said side marginal edges thereof to present arcuate lines of juncture between respective concavities of configuration conforming to said side marginal edges;

arcuate cap structure extending along each of said lines of juncture for rigidifying the screen; and a circumscribing collar about said screen and secured to said arcuate outer marginal edges of said concavities.

2. The screen as set forth in claim 1 wherein said structure defines three of said concavities.

* * * * *